(12) United States Patent
Graves

(10) Patent No.: US 10,500,518 B2
(45) Date of Patent: Dec. 10, 2019

(54) TOY RETRACTABLE LIGHT SABER

(71) Applicant: Jomoko Tamboura Graves, Toledo, OH (US)

(72) Inventor: Jomoko Tamboura Graves, Toledo, OH (US)

(73) Assignee: Jomoko T. Graves, Toledo, OH (US)

( * ) Notice: Subject to any disclaimer, the term of this patent is extended or adjusted under 35 U.S.C. 154(b) by 0 days.

(21) Appl. No.: 15/657,314

(22) Filed: Jul. 24, 2017

(65) Prior Publication Data

US 2019/0022542 A1 Jan. 24, 2019

(51) Int. Cl.
| | |
|---|---|
| *A63H 33/00* | (2006.01) |
| *F21V 8/00* | (2006.01) |
| *A63H 33/22* | (2006.01) |
| *F21V 23/04* | (2006.01) |

(52) U.S. Cl.
CPC ........... *A63H 33/009* (2013.01); *A63H 33/22* (2013.01); *G02B 6/0096* (2013.01); *F21V 23/04* (2013.01)

(58) Field of Classification Search
CPC .................................................... A63H 33/009
See application file for complete search history.

(56) References Cited

U.S. PATENT DOCUMENTS

| | | | | |
|---|---|---|---|---|
| 4,678,450 | A * | 7/1987 | Scolari | A63H 33/009 315/241 P |
| 4,697,228 | A * | 9/1987 | Mui | F21L 4/02 362/208 |
| 5,145,446 | A * | 9/1992 | Kuo | A63H 5/04 446/405 |
| 5,279,513 | A * | 1/1994 | Connelly | A63H 33/009 446/219 |
| 5,947,789 | A * | 9/1999 | Chan | A63H 33/009 362/277 |
| 9,579,587 | B1 * | 2/2017 | Chen | A63H 33/009 |
| 2004/0264098 | A1 * | 12/2004 | Eccles | F41H 13/0018 361/232 |
| 2007/0270077 | A1 * | 11/2007 | Woodhouse | A63H 33/009 446/473 |
| 2012/0055277 | A1 * | 3/2012 | Wu | F16H 25/2021 74/89.35 |

\* cited by examiner

*Primary Examiner* — Charlie Y Peng

(57) ABSTRACT

A light toy that is divided into hilt and blade may be used as a science fiction light saber, a signaling device, or illumination marker is disclosed. A light source sends a beam of light into a non-opaque tube along its axis. The elongated tube also known as the blade extends out in at least two sections by remote with an electric motor and can retract back into the hilt of the hollow structure of the device to be unseen. The light emitting device emanates a glow through the walls of the tube making the device highly visible. The motor that actuates the blade is hidden within hilt of the device. In addition, a sound board may be added to transmit sound while in use or play.

3 Claims, 5 Drawing Sheets

TOY RETRACTABLE LIGHT SABER

BACKGROUND OF THE INVENTION

Light emitting devices with elongated tubes extending beyond their lenses are known in the art. What's more, the present invention relates to the same art, but as a toy sword, particularly a retractable toy sword with visual and sound effects as simulated in at least one science fiction movie. One known such device employs the same principles as an open-ended tube which permits the device to be used as a light wand and a beam source. The light of this beam can be used to act as a laser and/or light saber or illuminate other objects but does not greatly enhance the visibility of the device itself. Though there have been some improvements in the structures of toy swords, such as a retractable sword formed by a hilt and blade sections, its use of a spring for rapid extension is still dangerous for children because such rapid extension may injure children's eyes. It is not ideal because a considerable force is required to retract the toy sword. So other alternatives were put in place by innovations that used removable elongated tubes, manual retraction of tube or partially manual and spring loaded tubes.

BRIEF SUMMARY OF THE INVENTION

The present invention provides an improved light emitting device which extends and retracts solely by remote and is intended for use as a toy, but which may readily be adapted to light sabers, wands for signaling or marking purposes. The device generally comprises a light source to produce a beam of light, such as a flashlight; a tube or light tunnel into which the beam of light is directed; and a cap on the end of the tube opposite the light source which reflects the light beam back into the interior of the light tube; so that the light entering the tube exits the device principally if not totally through the walls of the tube. The light tube becomes highly visible as the full output of the light source glows through its walls. The reflectivity and geometry of the elongated tube changes in diameter resulting in different desired effects; extension of sectional elongated tube and/or the retraction into the hilt of device.

In specific embodiments of the invention, the retractable light tunnel is attached to the light source and/or hilt in part by means of a short, open-ended tube along the outer edges. In addition by means of attachment to the hilt an internal retractable shaft runs along the inside of the tube as a guide and/or screw like shaft for extension and the opposite. This light tube attaches at one end to the light source and at the other-end to a closed light tube.

The end of the light tube opposite the light source attaches to the light tunnel. This attachment may be one of several different means. It may be a simple pressure fit where friction holds the tunnel in position. There may be interlocking circumferential grooves and ridges which engage each other. The two parts may have interlocking threads, or the light tunnel post may have longitudinal serrations which enhance the frictional strength of the joint.

The device disclosed within comprises a hollow hilt, a light source, a light tube molded in several different sections to come together as one working piece, and an inner guide and/or rotating screw like shaft that attaches to end cap. By result of the sectional components, this may to some degree simplify assembly of the completed device.

A method for extending and retracting a lighted sectional elongated tube entirely by remote into the hollow hilt of a device is also claimed.

BRIEF DESCRIPTION OF THE DRAWINGS

These and other objects and features of the invention will become more apparent from the following description taken in connection with the accompanying drawings wherein.

DETAILED DESCRIPTION OF THE SPECIFIC EMBODIMENTS

FIGS. 1 through 5 show different views of one embodiment of this invention which can be used as a science fiction light saber (toy), a signaling device, or illumination marker. The numbers used in the description for any particular part are the same regardless of which figure is being discussed.

Figure 1:
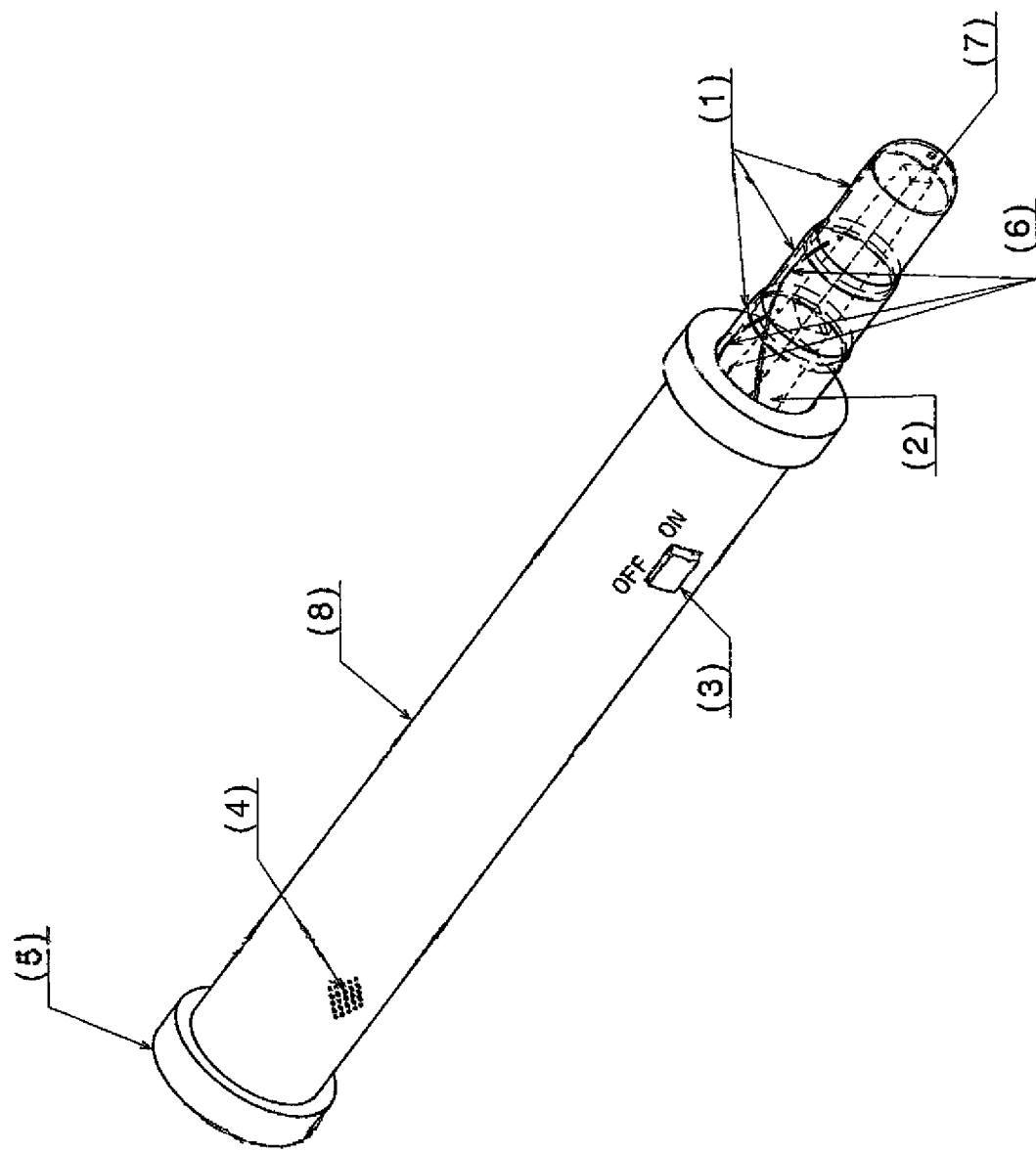
FIG. 1 is a perspective view of an assembled retractable light saber toy.

In referring to FIG. 1, shows a perspective view of an assembled retractable light saber toy. Section 1 of that figure shows at least 3 sections of the elongated light tube which is not limited to but extends and retracts in a twisting motion at the touch of the remote at section 3. Section 2 of that figure indicates a light source stationed within the hilt of the device. Section 3 of that figure shows a power and/or remote switch. Section 4 of that figure shows speaker. Section 5 of that figure indicates motor and/or power source within hilt of device. Section 6 of that figure shows the winding thread like pattern within the molding of the elongated light tube. Section 7 of that figure shows sectional internal elongated guide shaft. Section 8 of that figure shows the hilt or handle of the device.

Figure 2:
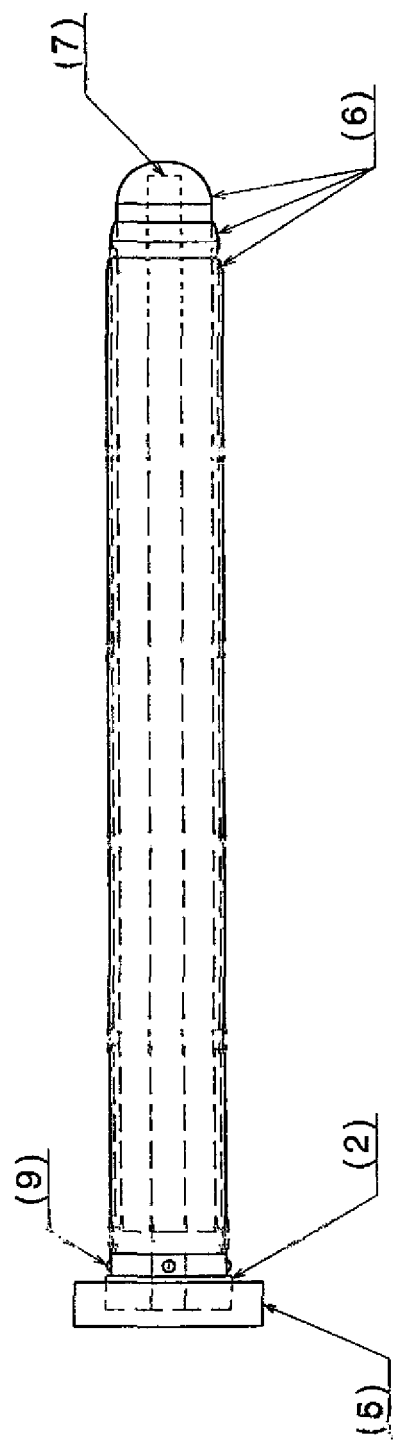
FIG. 2 is a retracted side elevation view of the device of FIG. 1.

In referring to FIG. 2, shows a retracted side elevation view of the device. Section 1 of that figure shows at least 3 sections of the elongated light tube. (See also FIG. 1). Section 2 of that figure indicates a light source stationed within the hilt of the device. (See also FIG. 1). Section 5 of that figure indicates motor and/or power source within hilt of device. (See also FIG. 1). Section 7 of that figure shows sectional internal elongated guide shaft. (See also FIG. 1). Section 9 of that figure shows screws and/or a form of attachment for device assembly.

Figure 3:
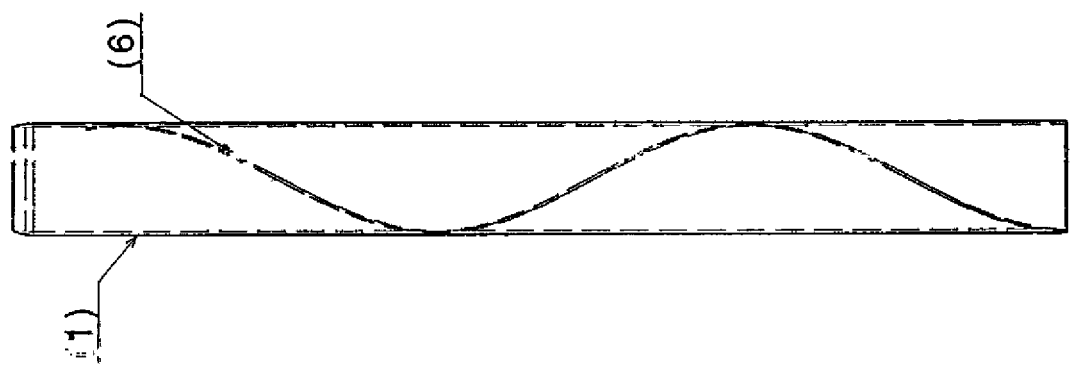
FIG. 3 is an elevated sectional view of elongated tube as shown in part in FIG. 1.

In referring to FIG. 3, shows an elevated sectional view of elongated tube. Section 1 of that figure shows one of at least 3 sections of elongated light tube. (See also FIG. 1). Section 6 of that figure shows the winding thread like pattern within the molding of the elongated light tube. (See also FIG. 1).

Figure 4:
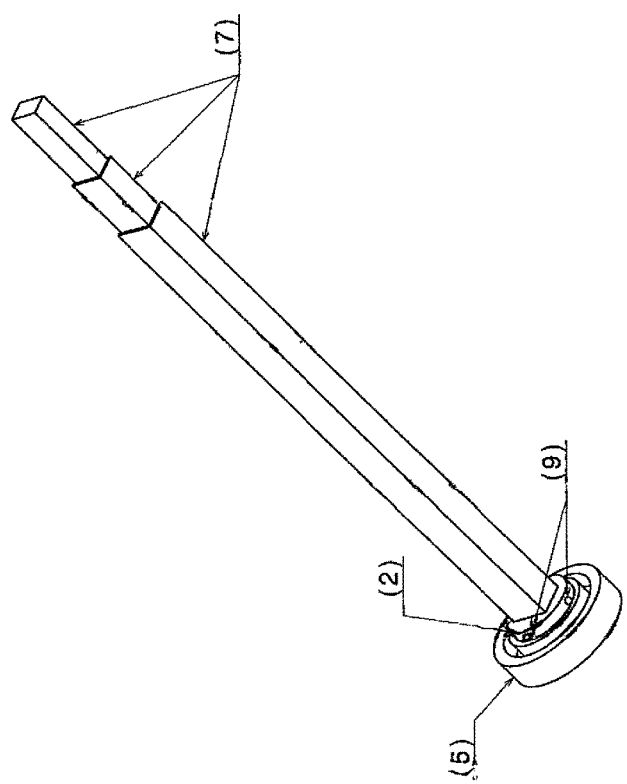
FIG. 4 is a perspective view of an assembled retractable internal guide shaft used to enhance the frictional force turning against the external surface of elongated light tube for extension and retraction.

In referring to FIG. 4, shows a perspective view of an assembled retractable internal guide shaft used to enhance the frictional force turning against the external surface of elongated light tube for extension and retraction. Section 2 of that figure shows a light source stationed within the hilt of the device. (See also FIG. 1). Section 5 of that figure shows motor and/or power source that is stationed within hilt of device. (See also FIG. 1). Section 7 of that figure shows at least three of sections of the internal elongated guide shaft. (See also FIG. 1). Section 9 of that figure shows screws and/or a form of attachment for device assembly. (See also FIG. 2).

Figure 5:
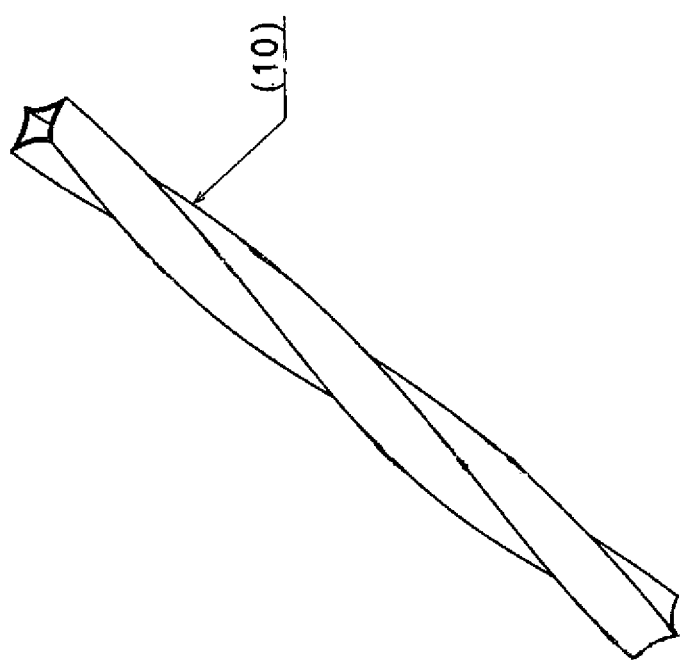
FIG. 5 in the alternative of FIG. 4 is a perspective view of a section of the internal elongated rotating shaft used to enhance the ease of extension and retraction of the stationary external surface of elongated light tube.

In referring to FIG. 5, in the alternative of FIG. 4, is a perspective view of at least one section of the internal elongated rotating shaft used to enhance the ease of extension and retraction of the stationary external surface of elongated light tube. Section 10 of that figure shows the winding thread like pattern within the molding of the elongated shaft.

Various modifications of the above-described and illustrated embodiments are possible within the scope of the invention defined by the appended claims.

PATENT CITATIONS

The invention claimed is:

1. A light emitting device comprising:
a handle;
a blade comprising a telescoping light tube having at least three telescoping tube sections;
an internal telescoping rotating shaft having at least a first telescoping shaft section, a second telescoping shaft section and a third telescoping shaft section;
an electric motor supported on said handle in driving relationship with said first section of said telescoping shaft section;
wherein said first, second and third sections of said internal telescoping rotating shaft have internal and external threads;
wherein said internal threads of one telescoping shaft section engage external threads of said second telescoping shaft section so that rotation of the first section of the telescoping shaft section causes said second telescoping shaft section to move towards or away from said handle;
wherein said third section of said at least three telescoping tube sections is attached to said third section of said internal rotating shaft;
wherein said telescoping tube sections does not rotate, but moves towards or away from said handle simultaneously with rotation of said internal rotating shaft.

2. The light emitting device as claimed in claim 1 and further comprising:
a light source that is supported within said handle and is operable to send a beam of light into said elongated telescoping non-opaque tube.

3. A light emitting device comprising:
a handle;
a retractable internal guide shaft comprising at least a first telescoping guide shaft section, a second telescoping guide shaft section and a third telescoping guide shaft section;
an electric motor supported on said handle and having a driving relationship with at least the first section of said at least three telescoping tube sections;
a blade comprising a telescoping light tube having at least three telescoping tube sections, each of said at least three telescoping tube sections having internal and external threads;
wherein said first section of said at least three telescoping tube sections has internal threads that engage external

| Cited Patent | Filing date | Publication date | Applicant | Title |
| --- | --- | --- | --- | --- |
| U.S. Pat. No. 2,672,707* | Mar. 14, 1951 | Mar. 23, 1954 | Abraham Bernstein | Noisemaking toy tool |
| U.S. Pat. No. 2,759,294* | Mar. 10, 1954 | Aug. 21, 1956 | Tigrett John B | Toy repeating pistol |
| U.S. Pat. No. 2,922,250* | Dec. 16, 1957 | Jan. 26, 1960 | Marvin I Glass | Toy |
| U.S. Pat. No. 3,037,320* | Jun. 14, 1960 | Jun. 5, 1962 | Powell Charles W | Lance |
| U.S. Pat. No. 3,407,514* | Apr. 4, 1966 | Oct. 29, 1968 | Earl L Barr | Alphabet educational toy |
| U.S. Pat. No. 4,231,077* | Dec. 27, 1977 | Oct. 28, 1980 | Joyce James E | Light toy |
| U.S. Pat. No. 4,678,450* | Jun. 7, 1984 | Jul. 7, 1987 | Life Light Systems | Toy light sword |
| U.S. Pat. No. 4,717,365* | Jan. 12, 1987 | Jan. 5, 1988 | Marvin Glass & Assoc. | Transformable toy vehicle and sword combination |
| U.S. Pat. No. 4,808,143* | Sep. 2, 1987 | Feb. 28, 1989 | Kuo Yi Y | Toy machine gun |
| U.S. Pat. No. 4,869,704* | Apr. 11, 1988 | Sep. 26, 1989 | Fisher Industries, Inc. | Toy |
| U.S. Pat. No. 4,904,222* | Apr. 27, 1988 | Feb. 27, 1990 | Pennwalt Corporation | Synchronized sound producing amusement device |
| U.S. Pat. No. 5,145,446* | Sep. 8, 1992 | Sep. 23, 1991 | Yuo Yi Y | Retractable toy sword with video and sound effect |
| U.S. Pat. No. 5,947,789* | Jul. 28, 1997 | Sep. 7, 1999 | Thinkway Trading Corp. | Toy sword having a variable color illuminated blade |
| GB2221626A* | | | | Title not available | threads of said second section of said at least three telescoping tube sections so that rotation of the first section of the telescoping tube section causes said second telescoping tube section to move towards or away from said handle;

wherein said third section of internal guide shaft section attaches to third section of said at least three telescoping tube sections;

wherein said internal telescoping guide shaft sections do not rotate, but moves towards or away from said handle simultaneously with rotation of said telescoping tube sections.

* * * * *